US010560832B2

(12) United States Patent
Kang

(10) Patent No.: US 10,560,832 B2
(45) Date of Patent: Feb. 11, 2020

(54) METHOD AND APPARATUS FOR INTERWORKING BETWEEN DEVICES FOR SHORT-RANGE COMMUNICATION

(71) Applicant: Samsung Electronics Co., Ltd., Suwon-si (KR)

(72) Inventor: Hyeon-Jin Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/825,625

(22) Filed: Aug. 13, 2015

(65) Prior Publication Data

US 2016/0050553 A1 Feb. 18, 2016

(30) Foreign Application Priority Data

Aug. 13, 2014 (KR) .................. 10-2014-0104942

(51) Int. Cl.
*H04W 8/00* (2009.01)
*H04W 76/10* (2018.01)
(Continued)

(52) U.S. Cl.
CPC ............. *H04W 8/005* (2013.01); *H04W 4/50* (2018.02); *H04W 4/80* (2018.02); *H04W 12/04* (2013.01);
(Continued)

(58) Field of Classification Search
CPC ..................................................... H04W 4/50
See application file for complete search history.

(56) References Cited

U.S. PATENT DOCUMENTS

2007/0232272 A1* 10/2007 Gonsalves .............. H04W 8/22
455/412.1
2007/0266079 A1* 11/2007 Criddle ................ G06Q 10/107
709/203
(Continued)

OTHER PUBLICATIONS

Communication and European Search Report dated Dec. 12, 2015 corresponding to European Patent Application No. EP 15 18 0956.
(Continued)

*Primary Examiner* — Hsinchun Liao
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Provided is a method and apparatus for supporting interworking between devices by using short-range communication. A server for supporting interworking between devices using short-range communication includes an interface unit configured to receive purchasing information regarding a first device and device information regarding a second device that is a target device for interworking with the first device and a controller configured to generate interworking information regarding the first device based on the device information received from the interface unit and to transmit the interworking information to the second device.

3 Claims, 14 Drawing Sheets

(51) Int. Cl.
  *H04W 4/50* (2018.01)
  *H04W 4/80* (2018.01)
  *H04W 12/04* (2009.01)
  *H04W 4/70* (2018.01)
  *H04W 12/06* (2009.01)

(52) U.S. Cl.
  CPC .............. *H04W 76/10* (2018.02); *H04W 4/70* (2018.02); *H04W 12/06* (2013.01)

(56) References Cited

U.S. PATENT DOCUMENTS

| | | | |
|---|---|---|---|
| 2007/0274271 A1* | 11/2007 | Jones | H04W 8/005 370/338 |
| 2008/0123572 A1* | 5/2008 | Nemori | H04W 76/005 370/296 |
| 2008/0313448 A1 | 12/2008 | Doumuki | |
| 2010/0005452 A1 | 1/2010 | Anson et al. | |
| 2013/0124595 A1 | 5/2013 | Oplinger et al. | |
| 2013/0137375 A1 | 5/2013 | Wilson et al. | |
| 2013/0191755 A1 | 7/2013 | Balog et al. | |
| 2013/0210412 A1 | 8/2013 | Larson et al. | |

OTHER PUBLICATIONS

Communication pursuant to Article 94(3) EPC and EPO Form 2906 dated Nov. 29, 2017 corresponding to European Patent Application No. EP 15180956.3.

\* cited by examiner

| Bluetooth | ON |
|---|---|
| PAIRED DEVICES | |
| TOM's Glass | |
| AVAILABLE DEVICES | |
| estimate | |
| [TV]Samsung LED50 | |
| estimate | |
| BULB | |
| SEARCH FOR DEVICES | |

FIG.6A

| Bluetooth | ON |
|---|---|
| PAIRED DEVICES | |
| TOM's Glass | |
| AVAILABLE DEVICES | |
| BULB(Bought from SAMSUNG ELECTRONICS STORE) | ~601 |
| estimate | |
| [TV]Samsung LED50 | |
| estimate | |
| SEARCH FOR DEVICES | |

FIG.6B

| Bluetooth | ON |
|---|---|
| PAIRED DEVICES | |
| TOM's Glass | |
| AVAILABLE DEVICES | |
| BULB  Previously paired with Galaxy Note 3 | ~701 |
| estimate | |
| [TV]Samsung LED50 | |
| estimate | |
| SEARCH FOR DEVICES | |

FIG.7

SELECT ACCOUNT — 1301
SELECT ...

OK  CANCEL

SELECT ACCOUNT
Samsung account

ENTER ID OF ACCOUNT
abc    OK

1302    OK  CANCEL

SELECT ACCOUNT
Samsung account

ENTER PASSPHRASE OF ACCOUNT
............    OK

1303    OK  CANCEL

SELECT ACCOUNT
Samsung account

SELECT POSITION TO BE MARKED — 1304
SELECT ...

OK  CANCEL

SELECT ACCOUNT
Samsung account

SELECT POSITION TO BE MARKED — 1305
BEDROOM
KITCHEN
LIVING ROOM
ADD ...

SELECT ACCOUNT
Samsung account

SELECT POSITION TO BE MARKED
LIVING ROOM

ENTER NAME — 1306

OK  CANCEL

SELECT ACCOUNT
Samsung account

SELECT POSITION TO BE MARKED
LIVING ROOM

ENTER NAME — 1307
LIGHT BULB IN FRONT OF TV

OK  CANCEL

FIG.13

METHOD AND APPARATUS FOR INTERWORKING BETWEEN DEVICES FOR SHORT-RANGE COMMUNICATION

RELATED APPLICATION(S)

This application claims the benefit under 35 U.S.C. § 119(a) of a Korean patent application filed in the Korean Intellectual Property Office on Aug. 13, 2014 and assigned Serial No. 10-2014-0104942, the entire disclosure of which is incorporated herein by reference.

BACKGROUND

Various embodiments of the present disclosure relate to a method and apparatus for inputting information about a device interworking with a second device when the devices interwork with each other for short-range communication.

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Smartphones used in recent times basically provide short-range wireless communication which is one of technical standards for data communication within a short range, such as Bluetooth, Wireless Fidelity (Wi-Fi), Near Field Communication (NFC), and so forth.

Bluetooth is a short-range wireless communication network that is available within a short range of about 10 meters (m). Due to its low price and low power consumption compared to other techniques, Bluetooth is basically mounted in most smartphone devices. Bluetooth connects a wireless device such as a headphone, a keyboard, or the like, and/or transmits data. To use Bluetooth for data communication, communication devices are registered with each other through a pairing procedure. In a Bluetooth pairing process, a terminal operating as a master device detects devices that may be paired, selects a device to be paired from among the detected devices, and performs pairing with the selected device.

Wi-Fi, which is frequently used in wireless Internet access of a smartphone, is a data technique for transmitting and receiving radio data using a Wireless Local Area Network (WLAN). In particular, an Access Point (AP) may be installed at home simply by installing a wireless Internet router, such that wireless communication is possible within a radius of up to 10-20 m. Moreover, Wi-Fi Direct transmits and receives data by wirelessly accessing another device without an AP, and thus is mainly used to exchange data between smart devices supporting Wi-Fi Direct. Because of having a broader transmission radius and a higher speed than Bluetooth, Wi-Fi Direct may be widely used in various forms such as a wireless printer, a smart TV, a fighting game, and so forth. When a terminal accesses a Wi-Fi AP, the terminal has to input a password or a Medium Access Control (MAC) address of an access-allowed device is registered in the Wi-Fi AP in advance to restrict an access of an unauthorized terminal to the Wi-Fi AP.

FIG. 1 illustrates an example of a procedure for providing interworking between devices for short-range communication according to conventional art.

Referring to FIG. 1, a distributor 101 creates an identifier, for example, a Quick Response (QR) code, for a new device 103 before delivering the new device 103 to a purchaser (that is, a user) purchasing the new device 103, gives the identifier to the new device 103, sets the new device 103 to an Internet-connectable state for interworking with Cloud 105 provided by a manufacturer or the distributor 101, and then delivers the new device 103 to the purchaser. Once the purchaser having received the new device 103 turns on the new device 103, the new device 103 is connected to the Cloud 105 according to preset information and scans a QR code of the new device 103 using an existing device 107 to interwork with the Cloud 105 of the preset manufacturer or distributor. Thus, the interworking information is transmitted to the existing device 107 and the new device 103 through the Cloud 105, such that the existing device 107 and the new device 103 interwork with each other.

According to the foregoing short-range communication technique, when a new device interworks with another device, a procedure for device registration has to be performed. That is, for Wi-Fi communication that allows an access of a device having a registered MAC address, a MAC address of the new device has to be registered in a Wi-Fi AP. In addition, a smart light bulb, a smart toothbrush, and so forth, which are capable of interworking with a smart device, has been developed and widely spread, and these devices do not include an input/output unit. As a result, in connection to the Wi-Fi AP, if authentication based on input of a password is required, the input of the password may not be easy to perform. Thus, an additional technique such as NFC is used, but mounting an NFC device used only for installation may increase unit cost. Moreover, in Bluetooth pairing, if there are many nearby devices participating in short-range communication, such as Bluetooth beacon, a smart light bulb, and the like, then many devices may be detected, making it difficult to identify a device for which pairing is to be attempted.

When a QR code is scanned using an existing device for interworking with a new device, the existing device needs to scan a QR code for the new device and thus a device for scanning the QR code, such as a camera, is also needed. Moreover, Internet connection for identifying the QR code and interworking the QR code with an external interpreter is also needed. As a result, interworking with a device that is incapable of Internet connection or does not have a camera mounted thereon is difficult to achieve. In practice, many Internet of Things (IoT) devices have low-power local network connectivity which has no direct external Internet connectivity like Bluetooth.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide a method and apparatus in which in a process of obtaining a new device for short-range communication, information about the new device is provided or information about an existing device is input to the new device, thereby facilitating detection and identification of the new device and interworking with the existing device.

In accordance with an aspect of the present disclosure, there is provided a server for supporting interworking between devices using short-range communication, the server including an interface unit configured to receive purchasing information regarding a first device and device information regarding a second device that is a target device for interworking with the first device and a controller configured to generate interworking information regarding the first device based on the device information received from the interface unit and to transmit the interworking information to the second device.

In accordance with another aspect of the present disclosure, there is provided a method for supporting interworking between devices using short-range communication at a server, the method including receiving purchasing information regarding a first device and device information regarding a second device that is a target device for interworking with the first device and generating interworking information regarding the first device based on the device information and transmitting the interworking information to the second device. In accordance with another aspect of the present disclosure, there is provided an apparatus for supporting interworking between devices using short-range communication, the apparatus including an interface unit configured to receive interworking information regarding a device through a server and a controller configured to control interworking with the device by using the received interworking information, in which in a process of purchasing the device, purchasing information regarding the device and device information regarding a target device that is a target device for interworking with the device are delivered to the server together.

In accordance with another aspect of the present disclosure, there is provided a method for supporting interworking between devices using short-range communication at a terminal, the method including receiving interworking information regarding a first device through a server, and interworking with the first device by using the received interworking information, in which in a process of purchasing the first device, purchasing information regarding the first device and device information regarding a second device that is a target device for interworking with the first device are delivered together to the server.

In accordance with another aspect of the present disclosure, there is provided an apparatus for supporting interworking between devices using short-range communication, the apparatus including a first device that is to interwork, a second device that is a target device for interworking with the first device, and a server configured to sell the first device, to receive purchasing information regarding the first device and information regarding the second device, and to transmit interworking information regarding the first device to the second device.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIGS. 6A and 6B illustrate an example of displaying a Bluetooth paring target list in an existing device during device interworking according to an embodiment of the present disclosure;

FIG. 7 illustrates another example of displaying a Bluetooth pairing target list according to an embodiment of the present disclosure;

FIG. 13 illustrates a method for inputting position information to a new device in a purchasing process when the new device serves as a position marker according to an embodiment of the present disclosure;

Throughout the drawings, like reference numerals will be understood to refer to like parts, components, and structures.

DETAILED DESCRIPTION

Figure 1:
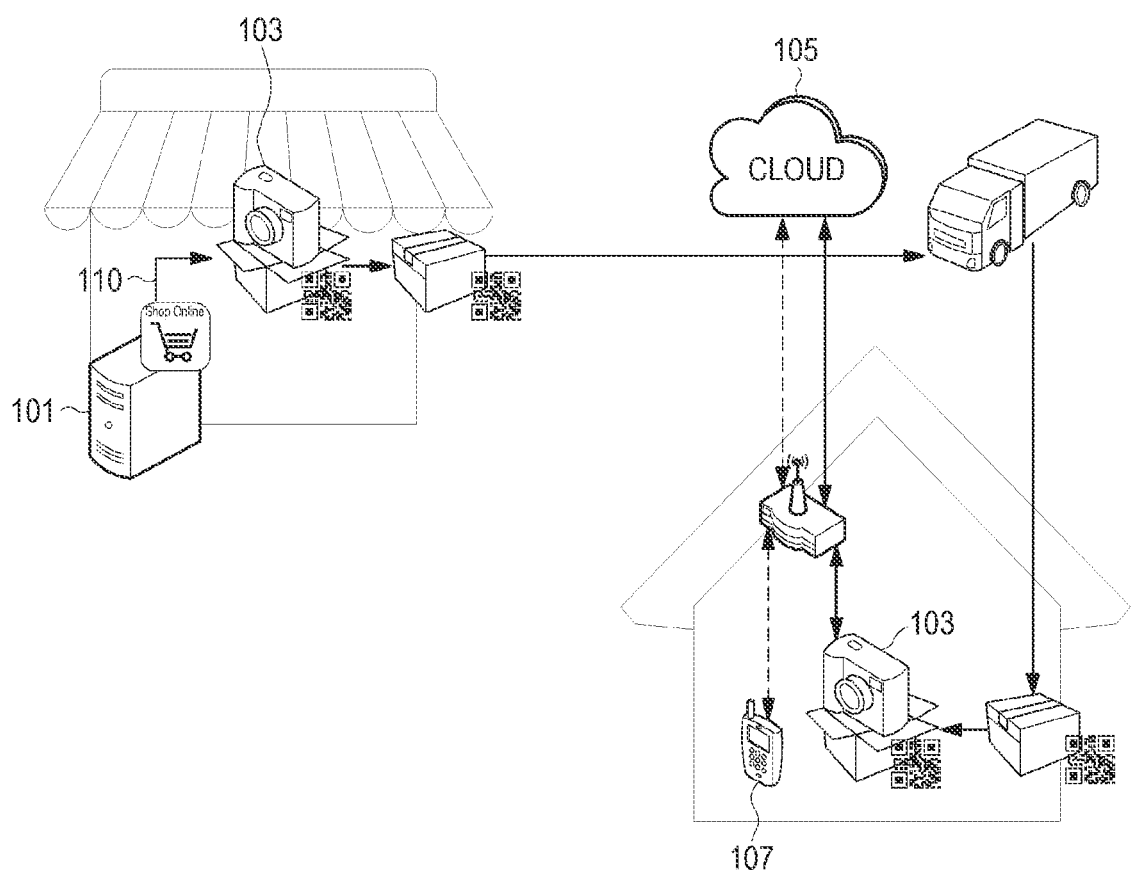
FIG. 1 illustrates an example of a procedure for providing interworking between devices for short-range communication according to a conventional art.

Exemplary embodiments of the present disclosure will be described herein below with reference to the accompanying drawings. Although specific embodiments of the present disclosure are illustrated in the drawings and relevant detailed descriptions are provided, various changes can be made to the exemplary embodiments and various exemplary embodiments may be provided. Accordingly, the various exemplary embodiments of the present disclosure are not limited to the specific embodiments and should be construed as including all changes and/or equivalents or substitutes included in the ideas and technological scopes of the exemplary embodiments of the present disclosure. In the explanation of the drawings, similar reference numerals are used for similar components.

The term "include" or "may include" used in the exemplary embodiments of the present disclosure indicates the presence of disclosed corresponding functions, operations, components, or the like, and does not limit additional one or more functions, operations, components, or the like. In addition, it should be understood that the term "include" or "has" used in the exemplary embodiments of the present disclosure is to indicate the presence of features, numbers, steps, operations, components, parts, or a combination thereof described in the specifications, and does not preclude the presence or addition of one or more other features, numbers, steps, operations, components, parts, or a combination thereof.

The term "or" or "at least one of A or/and B" used in the various exemplary embodiments of the present disclosure includes any and all combinations of the associated listed items. For example, the term "A or B" or "at least one of A or/and B" may include (1) at least one A, (2) at least one B, or (3) both at least one A and at least one B.

Although the terms such as "first" and "second" used in the various exemplary embodiments of the present disclosure may modify various components of the various exemplary embodiments, these terms do not limit the corresponding components. For example, these terms do not limit an order and/or importance of the corresponding components. These terms may be used for the purpose of distinguishing one component from another component. For example, a first user device and a second user device all indicate user devices or may indicate different user devices. For example, a first component may be named as a second component without departing from the right scope of the various exemplary embodiments of the present disclosure, and similarly, a second component may be named as a first component.

When it is described that a component (such as a first component) is "operatively or communicatively coupled" to or "connected" to another component (such as a second component), the component can be directly connected to the other component or can be connected to the other component through a third component. However, when it is described that a component (such as a first component) is "directly connected" or "directly coupled" to another component (such as a second component), it means that there is no intermediate component (such as a third component) between the component and the other component.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a CPU or an application processor) that can perform a corresponding operation by executing at least one software program stored at an exclusive processor (such as an embedded processor) for performing a corresponding operation or at a memory device.

The terms used in the various exemplary embodiments of the present disclosure are for the purpose of describing particular exemplary embodiments only and are not intended to be limiting. As used herein, the singular forms are intended to include the plural forms as well, unless the context clearly indicates otherwise.

Unless defined otherwise, all terms used herein have the same meanings as generally understood by those having ordinary knowledge in the technical field to which the present disclosure pertains. Terms generally used and defined in dictionaries should be interpreted as having meanings consistent with meanings construed in the context of the related art, and should not be interpreted as having ideal or excessively formal meanings unless defined explicitly in this application. Depending on circumstances, terms defined in this document may not be interpreted as excluding embodiments of the present disclosure.

Hereinafter, various embodiments of the present disclosure will be described with reference to the accompanying drawings. Like components are referred to as like reference numerals even through being illustrated in different drawings, and in the following description, only parts necessary for understanding of operations according to embodiments of the present disclosure will be described and other parts will not be described not to obscure the subject matter of the present disclosure.

Figure 2:
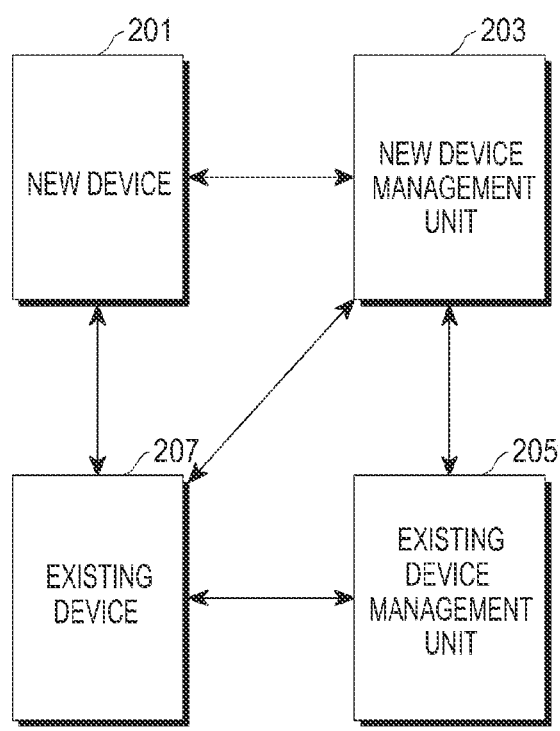
FIG. 2 is a block diagram illustrating a structure of an apparatus for providing a method for interworking between devices for short-range communication according to an embodiment of the present disclosure.

FIG. 2 is a block diagram illustrating a structure of an apparatus for providing a method for interworking between devices for short-range communication according to an embodiment of the present disclosure.

Referring to FIG. 2, an apparatus for interworking between devices for short-range communication according to an embodiment of the present disclosure may include a new device 201, a new device management unit 203, an existing device management unit 205, and an existing device 207. Each unit may not be strictly separated and each unit may exist as a plurality of units. Each device may include an interface unit and a controller.

The new device 201, which newly joins short-range communication, may include information such as its Wireless Fidelity (Wi-Fi) Medium Access Control (MAC) address, Bluetooth MAC address, an International Mobile Station Equipment Identity (IMEI), which is an unique Identification (ID) of a device used in a cellular network, and so forth, and may further include a password, which is an authentication key for Wi-Fi connection. The new device 201 is capable of interworking with another device by using short-range communication such as Wi-Fi, Bluetooth, or the like, and may be set to be preferentially identified by or to preferentially interwork with a device designated by the new device management unit 203 or the existing device management unit 205 and the existing device 207. Once a user obtains a new device and causes the new device to interwork with an account that interworks with the existing device management unit 205, then the new device becomes an existing device from that time.

The new device management unit 203 inputs information to the new device 201. The information may include a password that is a password of a Wi-Fi device of a user having purchased and using the new device 201. If the new device 201 operates as a Bluetooth beacon indicating a position, the information may include a name of a position that is to be broadcast by the new device 201. The information may also include a name used for other devices to identify the new device.

The new device management unit 203 obtains unique information of the new device 201, such as a Wi-Fi MAC address, a Bluetooth MAC address, an IMEI value, and the like. The new device management unit 203 may also obtain information of the existing device 207 directly from the existing device 207 or through the existing device management unit 205.

The new device management unit 203 transmits the unique information of the new device 201 and information designated by the user for the new device 201 to the existing device 207 or the existing device management unit 205. By using the information about the new device 201 transmitted from the new device management unit 203, the existing device 207 or the existing device management unit 205 may input the information about the new device 201 required for interworking in advance in spite of absence of the new device 201.

The existing device management unit 205 manages the existing device 207 to interwork based on an account that is available in common, and to this end, transmits identical information to existing interworking devices at the same time or inputs particular information to some of the existing interworking devices. Account information for logging in the account may be stored in a physically separated or logically distinguished separate account server or in a memory of the existing device management unit 205. The existing device 207 is a device the user has already owned, and may include any type of devices.

Figure 3A:
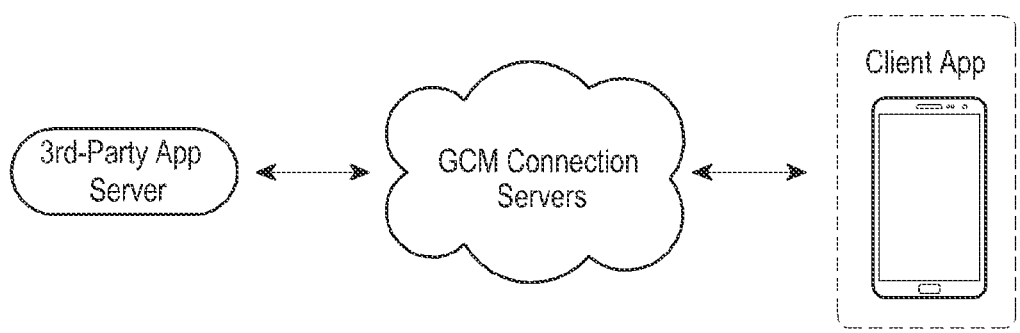
FIGS. 3A and 3B illustrate an interworking system according to a conventional art.
Figure 3B:
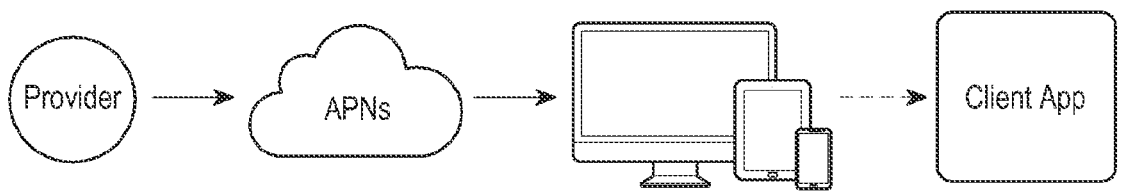

FIGS. 3A and 3B illustrate an interworking system according to a conventional art.

Referring to FIG. 3A, a smart device may interwork based on an account service called "Account", and for devices interworking with each other through the account, a command and information may be input to the devices using another device interworking with the devices through the same account. For example, a device A interworking through an e-mail account of "Account", abc@email.com, may install an application in a device B interworking through the same Google account or may cause various data to be received in the device B. In this case, the same Google account serves as the existing device management unit 205 of FIG. 2. Data delivery from the device A to the device B is referred to as "Push". FIG. 3B illustrates an example of another conventional account service.

The existing device management unit 205 of FIG. 2 may store information of a device having interworked with the existing device 207 of FIG. 2 and provide the information to another device interworking through the same account. If the device A and the device B may interwork, or are interoperable, with each other through the same account and the user causes a device C having interworked with the device A to interwork with the device B, then the existing device management unit 205 of FIG. 2 causes the device B to recognize that the device C has a history of having interworked with the device A, and to this end, the existing device management unit 205 may provide information about the device C to the device B.

As mentioned above, once the new device 201 interworks through an account of the existing device management unit 205 of FIG. 2, the new device 201 becomes an existing device, and the existing device 207 of FIG. 2 may have existing interworking information in addition to a function of the new device 201 of FIG. 2. The existing interworking information may be information about another device with which the existing device has interworked, and the existing device 207 of FIG. 2 provides the existing interworking information to the existing device management unit 205 of FIG. 2. If a device with no history of having interworked is detected, it may be determined using the existing interworking information whether the device has a history of having interworked with another device having the same account of the existing device management unit 205 of FIG. 2.

Figure 4:
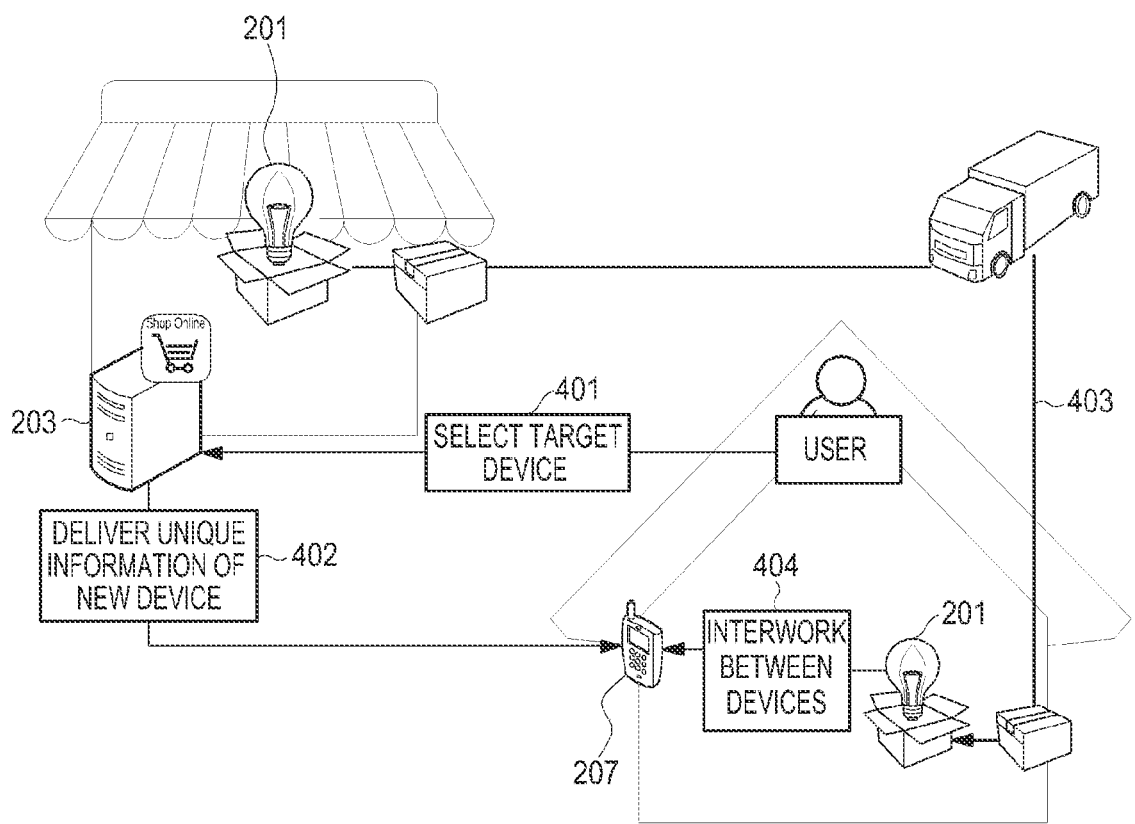
FIG. 4 illustrates a method for inputting information about a new device in an existing device in advance according to an embodiment of the present disclosure.

FIG. 4 illustrates a method for inputting information about a new device to an existing device in advance according to an embodiment of the present disclosure.

Referring to FIG. 4, in a process of purchasing the new device 201 capable of short-range communication in an Internet shopping mall, the user selects a payment method and inputs contact information and delivery address information of the user. At this time, the user selects, in 401, a target device 207 with which the new device 201 is to interwork from among existing devices, previously receives, in 402, information about the new device 201, such as a Bluetooth MAC address, from the new device management unit 203, and registers the information about the new device 201 in the target device (existing device) 207. Thereafter, the new device 201 is delivered to the user in 403, and the user performs, in 404, Bluetooth pairing between the new device 201 and the existing device to which the user has transmitted the information about the new device 201. The existing device having received the information about the new device 201 may display the new device 201 on top of a list of detected connectable devices other than the new device 201. Additionally, the existing device may display where the new device 201 has been purchased, together with a name of the new device 201 in a pairing target list, allowing the user to easily identify the new device 201. The new device may also be set to be automatically Bluetooth paired with the existing device.

Figure 5:
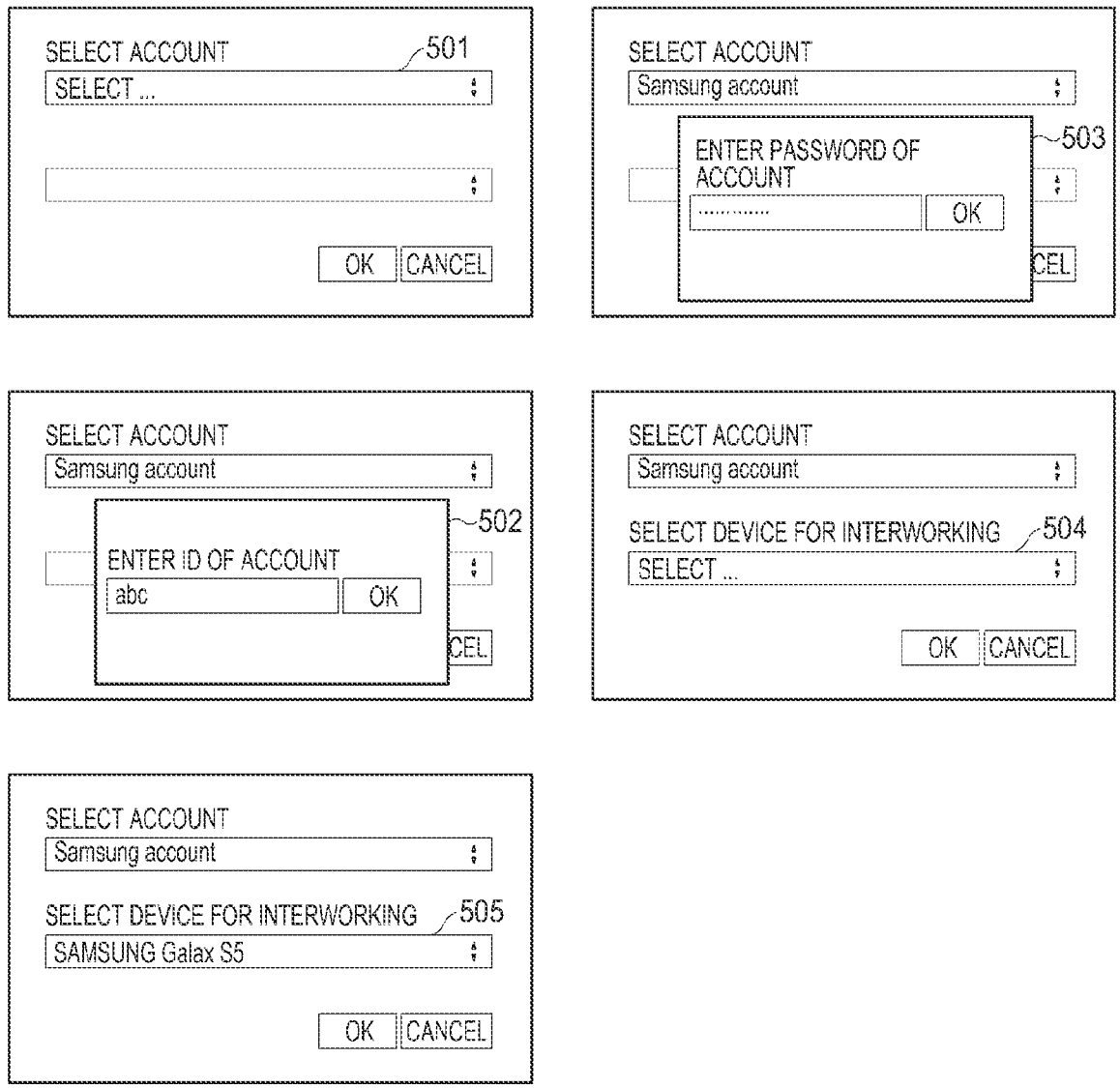
FIG. 5 illustrates a process of selecting a target device with which a new device is to interwork in a process of purchasing the new device according to an embodiment of the present disclosure.

FIG. 5 illustrates a process of selecting a target device with which a new device is to interwork in a process of purchasing the new device according to an embodiment of the present disclosure.

Referring to FIG. 5, an account in which a target device for interworking with a new device (e.g., the new device 201 of FIG. 2) is registered is selected in popup window or window 501, and information (an ID and a password of the account) necessary for logging in to the account is input in windows 502 and 503, respectively. Finally, the target device for interworking with the new device is selected in windows 504 and 505, respectively.

FIGS. 6A and 6B illustrate an example of displaying a Bluetooth pairing target list in an existing device in device interworking according to an embodiment of the present disclosure.

Generally, as shown in FIG. 6A, when Bluetooth pairing is performed, in an order of signal strengths of a signal-sensing device (an existing device according to the present disclosure) and a signal-sensed device (a new device according to the present disclosure), the devices are arranged, and a list of the arranged devices is displayed. If there are a plurality of devices having the same name, the devices having the same name are difficult to distinguish because only the names of the devices are displayed. However, according to an embodiment of the present disclosure, as shown in FIG. 6B, information about a new device is registered in advance in an existing device and is displayed on top of a pairing target list, such that the new device may be easily identified even if other devices having the same device exist as in 601 FIG. 6B.

FIG. 7 illustrates another example of displaying a Bluetooth pairing target list according to an embodiment of the present disclosure.

As stated above, an existing device (e.g., the existing device 207 of FIG. 2) provides information about another device with which an existing device has interworked to an existing device management unit, and if a new device having no history of having interworked is detected when pairing is performed, it is determined whether the new device has a history of having interworked with another device having the same account of the existing device management unit by using existing interworking information stored in the existing device management unit. If the new device has a history of having interworked, the new device is placed on top of the pairing target list as indicated by 701 of FIG. 7, and the existing interworking information is displayed together with a name of the new device, facilitating identification of the new device.

Figure 8:
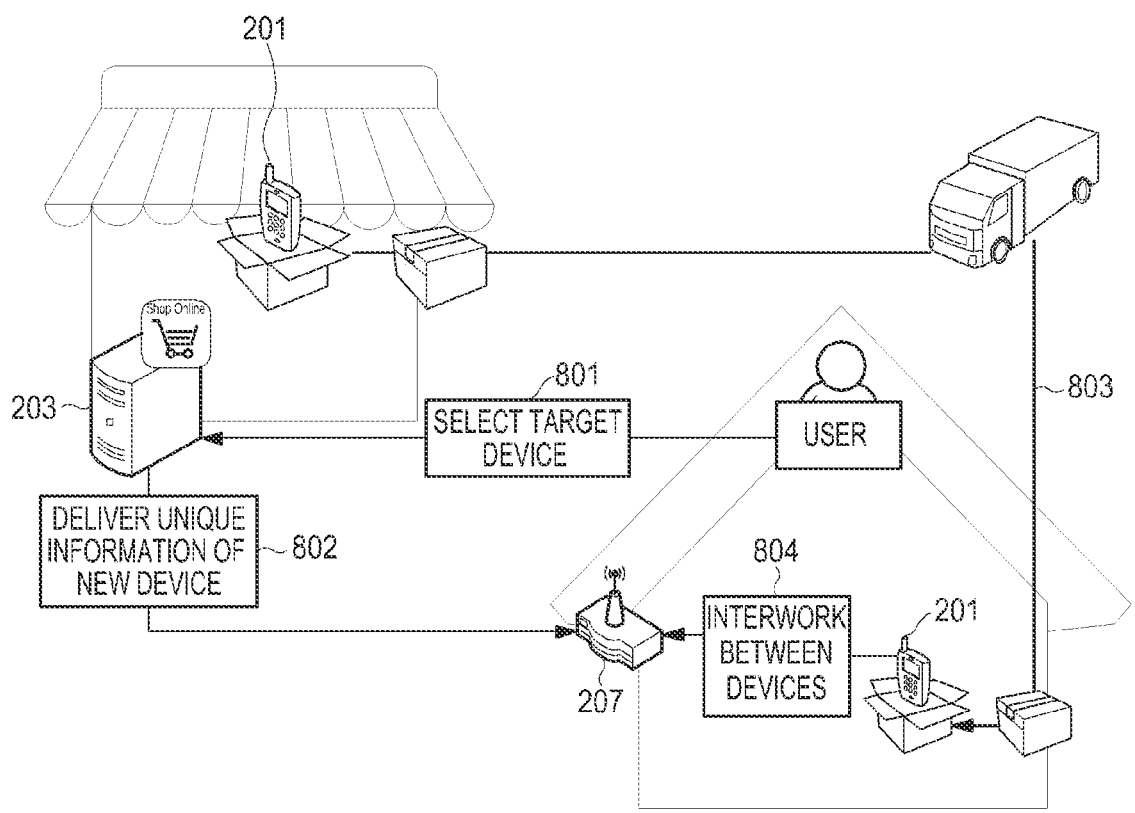
FIGS. 8 and 9 illustrate a procedure for pushing a MAC address of a new device to a Wi-Fi AP that is an existing device according to an embodiment of the present disclosure.
Figure 9:
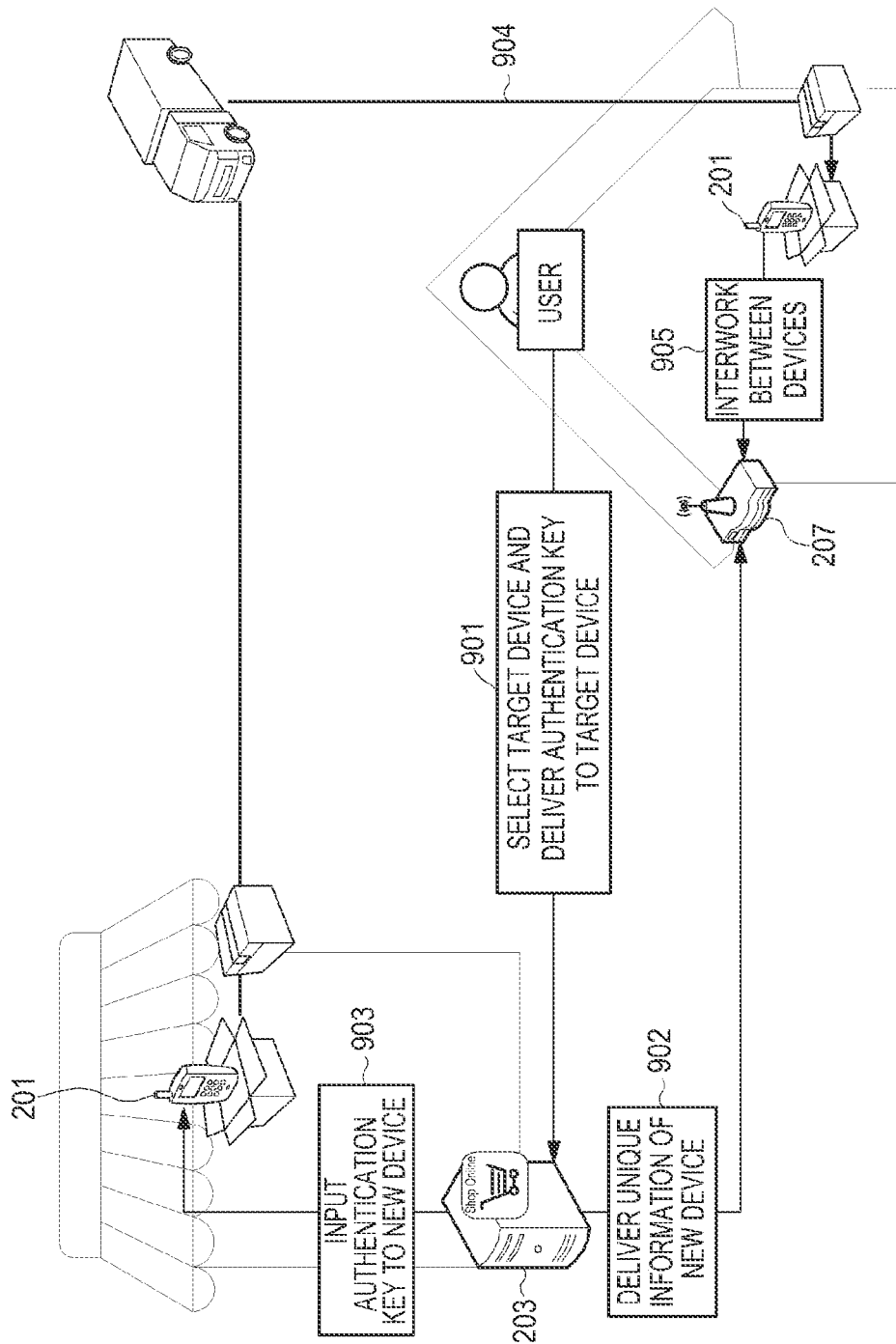

FIGS. 8 and 9 show a procedure for pushing an MAC address of a new device to a Wi-Fi Access Point (AP) that is an existing device, according to an embodiment of the present disclosure.

Referring to FIG. 8, if a Wi-Fi AP acts as the existing device 207 (of FIG. 2) owned by the user is set to determine whether a Wi-Fi MAC address of a device connected to the Wi-Fi AP (the existing device 207) is included in a connection-allowed device list, the user selects, in 801, the Wi-Fi AP (the existing device 207), which is a target device for interworking with the new device 201, as described above in a process of purchasing the new device 201 which is to interwork with the Wi-Fi AP (the existing device 207), receives a Wi-Fi MAC address, which is unique information of the new device 201, from the new device management unit 203, and registers, in 802, the Wi-Fi MAC address in the Wi-Fi AP (the existing device 207) in advance. If the new device 201 is delivered in 803, the user causes the new device 201 and the Wi-Fi AP (the existing device 207) to interwork, in 804, with each other using the Wi-Fi MAC address of the new device 201, which has been registered in the Wi-Fi AP (the existing device 207) in advance.

The user may also provide password information of the Wi-Fi AP of the user to a distributor (or a new device management unit) in a process of purchasing the new device, to request the distributor to previously input the password of the Wi-Fi AP of the user to the new device prior to delivery of the new device.

That is, referring to FIG. 9, when selecting a target device for interworking with the new device 201 in a process of purchasing the new device 201, the user sends a password of the target device, the Wi-Fi AP (the existing device 207), to the new device management unit 203 in 901. The new device management unit 203 transmits unique information (that is, the Wi-Fi MAC address) of the new device 201 to the target device (the existing device 207) in 902, inputs the password of the Wi-Fi AP received from the user to the new device 201 in 903, and delivers the new device 201 to the user in 904. Thereafter, the user causes the new device 201 and the target device (the existing device 207) to interwork with each other by using interworking information of the new device 201 input in advance to the target device (the existing device 207) and interworking information of the Wi-Fi AP input in advance to the new device 201, in 905.

In another way to input the password of the Wi-Fi AP to a new device, when a distributor (or an online shopping mall) capable of serving as a new device management unit receives purchasing information of the new device from a purchaser (or user), the user is caused to input the password of the Wi-Fi AP and the input information may be delivered to the existing device management unit (e.g., the account server) or to the existing device through the existing device management unit.

Figure 10:
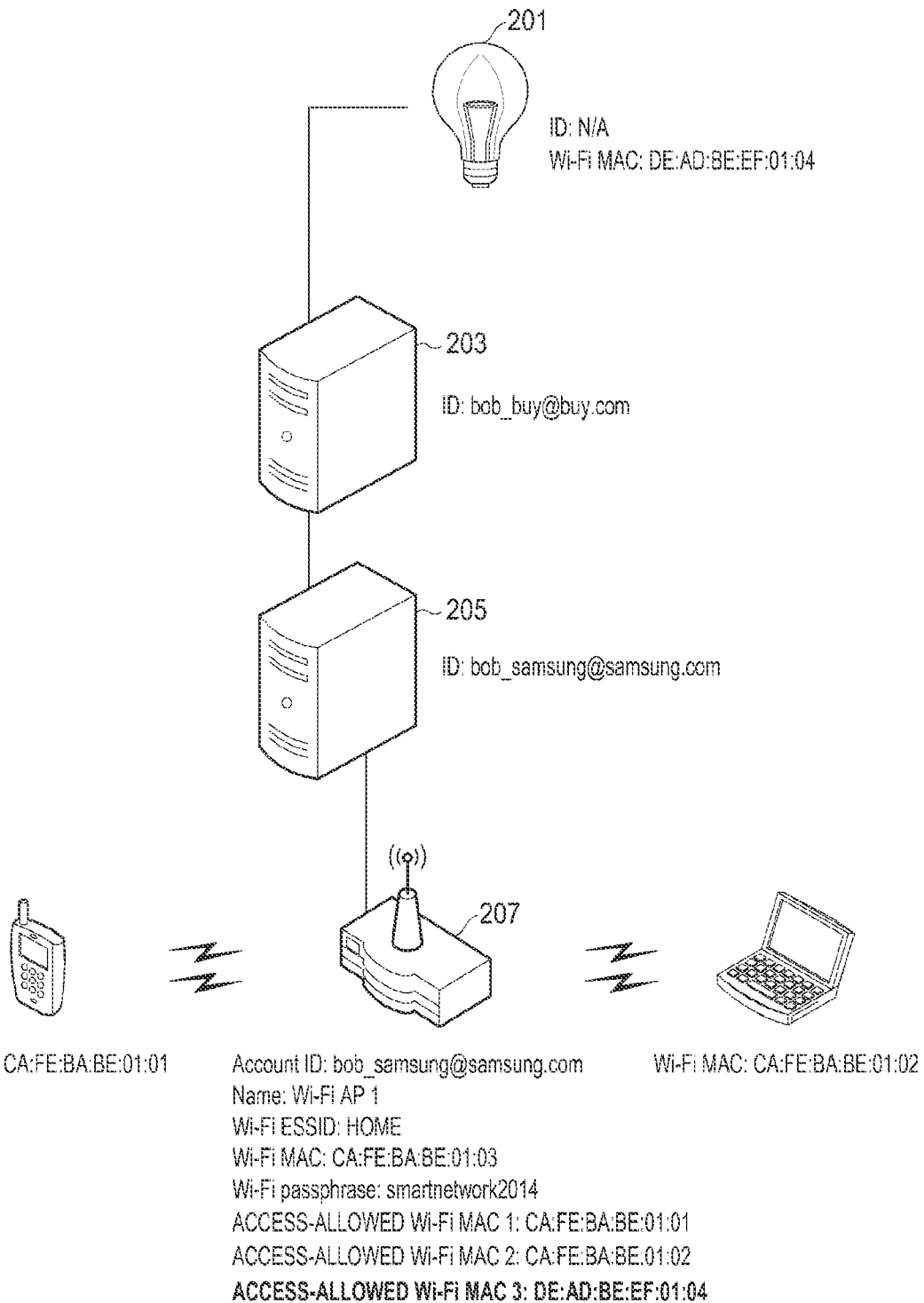
FIG. 10 illustrates a process of delivering a Wi-Fi MAC address of a smart light bulb, which is a new device, to a Wi-Fi AP, which is an existing device, according to an embodiment of the present disclosure.

FIG. 10 illustrates a process of delivering a Wi-Fi MAC address of a smart light bulb, which is a new device, to a Wi-Fi AP, which is an existing device, according to an embodiment of the present disclosure.

Referring to FIG. 10, the new device management unit 203, the online shopping mall, delivers the Wi-Fi MAC address of the new device 201 to the existing device management unit 205 which then delivers the Wi-Fi MAC address of the new device 201 to the existing device, the Wi-Fi AP (the existing device 207). Then, the Wi-Fi AP (the existing device 207) adds the MAC address of the new device 201 delivered from the existing device management unit 205 to an access-allowed list in addition to MAC addresses of a cellular phone and a laptop computer, previously registered in the access-allowed list.

Figure 11:
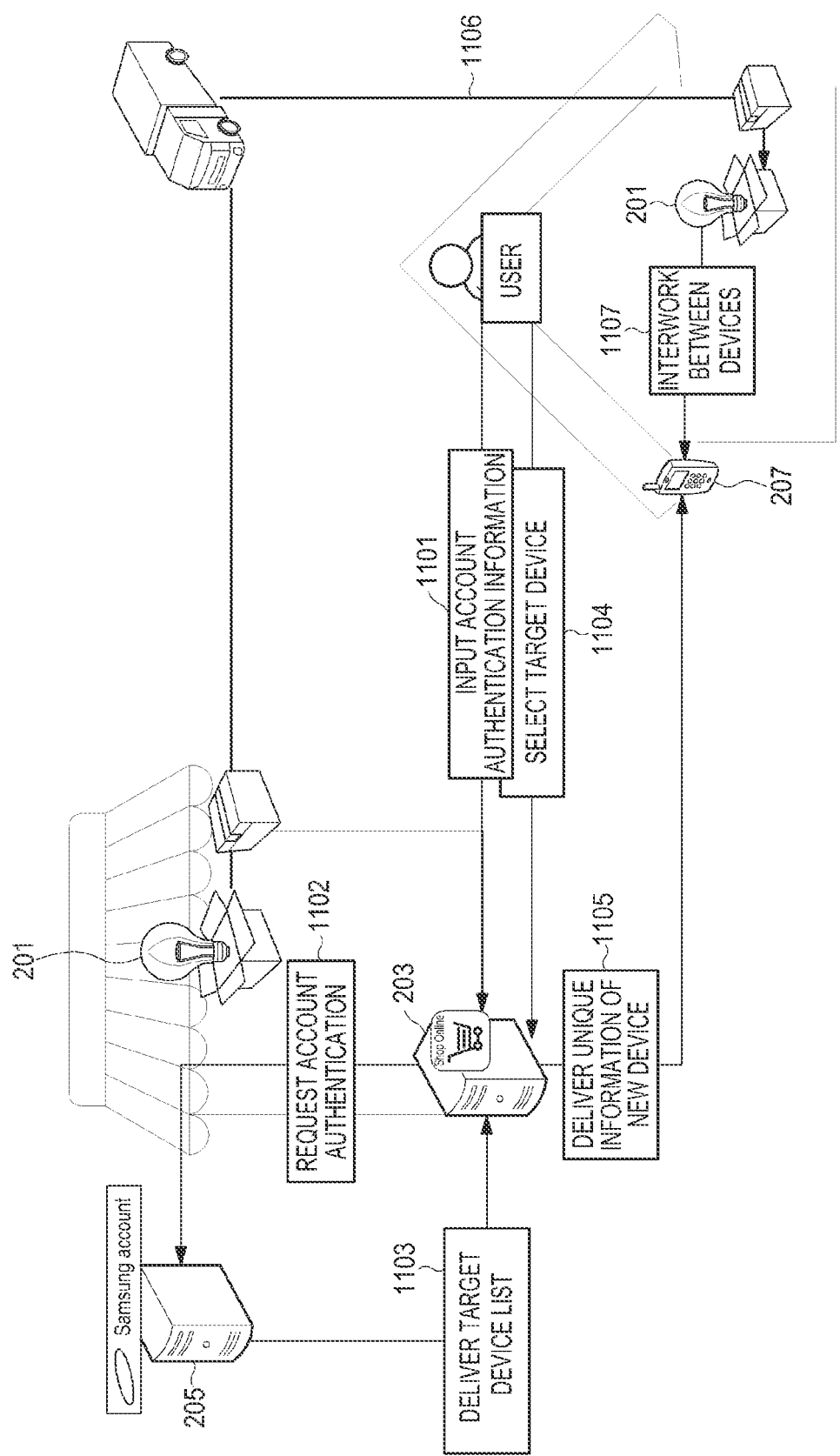
FIGS. 11 and 12 illustrate a method for delivering unique information of a new device through an on-line distributor, which is a new device management unit, and an account server, which is an existing device management unit, according to an embodiment of the present disclosure.
Figure 12:
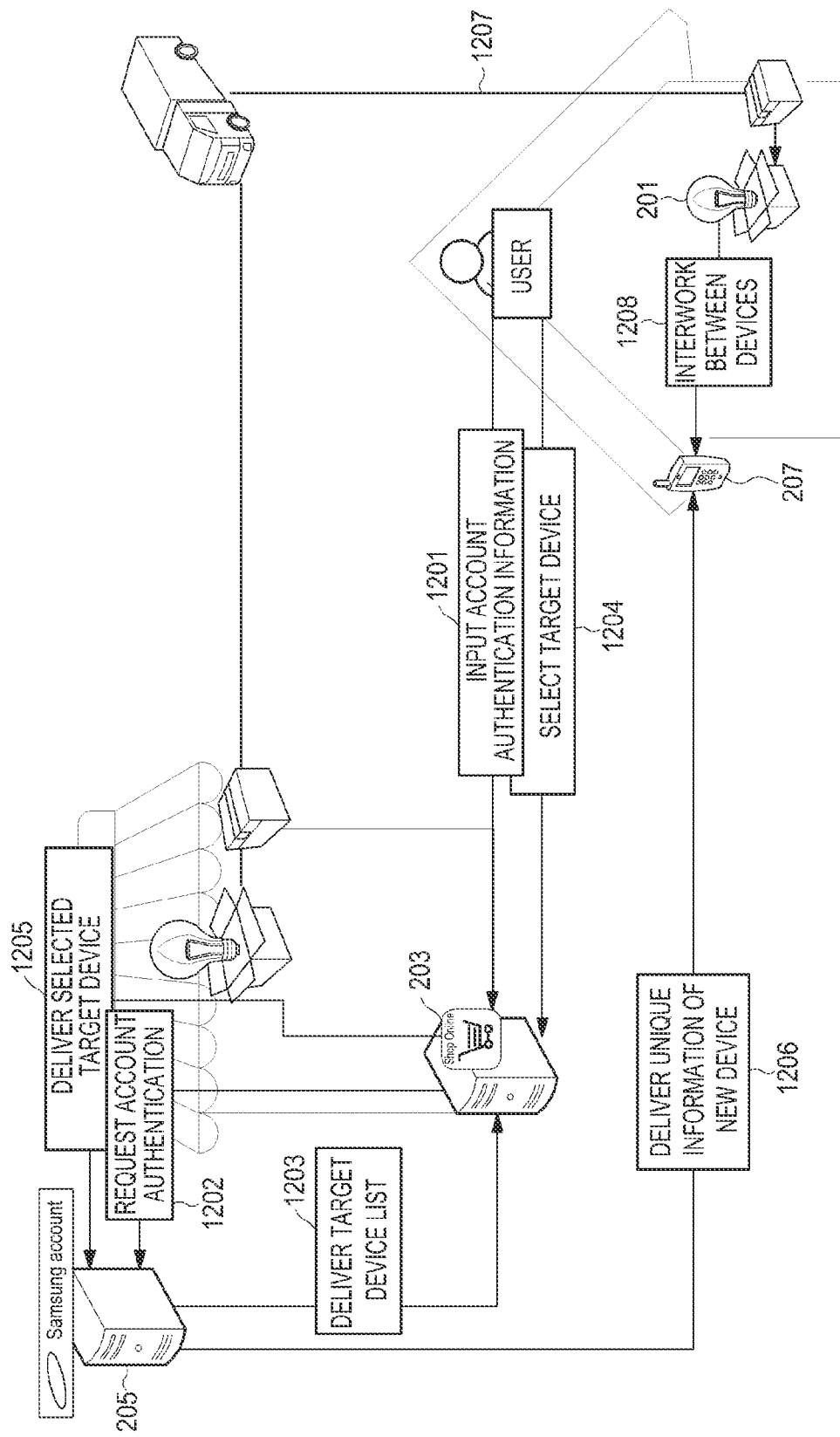

FIGS. 11 and 12 illustrate a method for delivering unique information of a new device through an online distributor, which is a new device management unit, and an account server, which is an existing device management unit, according to an embodiment of the present disclosure.

Referring to FIG. 11, when a user purchases the new device 201 in an online shopping mall, the user inputs account authentication information of an existing device in 1101 in a process of selecting a target device, which is the existing device 207 for interworking with the new device 201. Then, the online shopping mall server, which is the new device management unit 203, sends an authentication request to the account server, which is the existing device management unit 205, in 1102, and the account server 205 delivers a target device list registered with a corresponding account to the online shopping mall server 203 in 1103. Then, the online shopping mall server 203 displays the target device list to the user who then selects a target device for interworking with the new device 201 from the displayed list in 1104. Once the purchase of the new device 201 is completed, the online shopping mall server 203 delivers unique information of the new device 201 to the user-selected target device (the existing device 207) by using the interworking system as shown in FIG. 3 in 1105. If the new device 201 is delivered in 1106, the new device 201 and the target device (the existing device 207) interwork with each other by using the information delivered in advance to the target device (the existing device 207) in 1107.

Referring to FIG. 12, when the user purchases the new device 201 in the online shopping mall, if the user inputs account authentication information of an existing device (e.g., the existing device 207) in a process of designating a target device, which is the existing device for interworking with the new device 201, in 1201, then the online shopping mall server, which is the new device management unit 203, sends an authentication request to the account server, which is the existing device management unit 205, in 1202, and the account server 205 delivers a target device list registered in the account to the online shopping mall server 203 in 1203. Then, the online shopping mall server 203 displays an interoperable target device list to the user, and the user selects a target device for interworking with the new device 201 from the displayed list in 1204. The online shopping mall server 203 then delivers information about the user-selected target device to the account server 205 in 1205, and the account server 205 then delivers unique information of the new device 201 to the selected target device in a push manner or the like in 1206. Once the new device 201 is delivered in 1207, the new device 201 and the target device (the existing device 207) interwork with each other by using the unique information of the new device 201 delivered in advance to the target device (the existing device 207) in 1208.

FIG. 13 illustrates a method for inputting position information to a new device in a purchasing process when the new device serves as a position marker according to an embodiment of the present disclosure.

According to an embodiment of the present disclosure, when a new device serves as a position marker like a beacon or the like, position information to be marked by the new device and a name to be used for a management device to identify the new device may be previously selected in a purchasing process. That is, for a device having no input/output unit such as a smart light bulb, a smart toothbrush, or the like, the purchaser may input desired information to the new device through a new device management unit such as an online distributor or a device manufacturer.

Referring to FIG. 13, the user selects an account in which a new device is to be registered like in FIG. 5 in window 1301 in a process of purchasing the new device, and inputs log-in information of the account in windows 1302 and 1303, respectively. After selecting a position to be marked by the new device in menus 1304 and 1305, the user inputs a name for identifying the new device in menus 1306 and 1307, respectively.

Then, the new device management unit or the existing device management unit delivers information about the new device to the existing device through the procedure shown in FIG. 11 or 12, and after delivery of the new device, the new device and the existing device interwork with each other by using the information delivered in advance to the existing device.

If the purchase of the new device is canceled, the information input to the new device management unit and the information delivered to the existing device management unit may be deleted and a detailed procedure for deleting the information does not have to be limited by the present disclosure.

Figure 14:
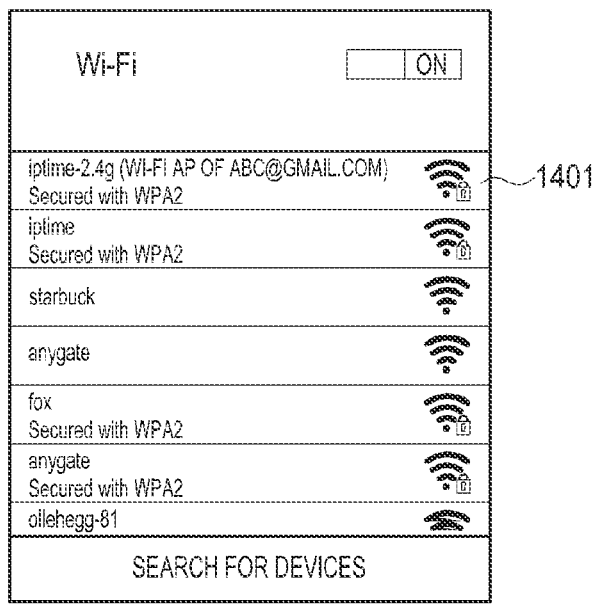
FIGS. 14 and 15 illustrate a method for arranging a list of interworking-target devices according to an embodiment of the present disclosure.
Figure 15:
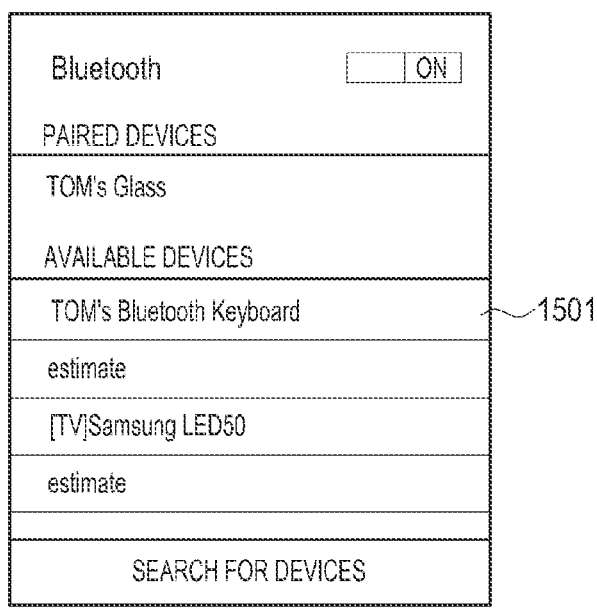

FIGS. 14 and 15 illustrate a method for arranging a list of interworking-target devices displayed in an existing device according to an embodiment of the present disclosure.

Referring to FIG. 14, if a device having a history of having been Bluetooth-paired with an existing device interworking with a user account is detected from a pairing-possible (or pairable) target device list in a process of performing Bluetooth-pairing with another device interworking with the same user account, the device may be placed on top of the pairable target device list or information indicating that the device has a history of having been Bluetooth-paired with the existing device may be indicated in the list, together with a name of the device, to allow the user to easily identify the device as in 1401.

Referring to FIG. 15, when an interoperable device list is displayed, a device including user identification information, such as a user name or a user ID, in addition to names of detected devices is placed on top of the interoperable device list, allowing the user to easily identify the device in 1501.

Figure 16:
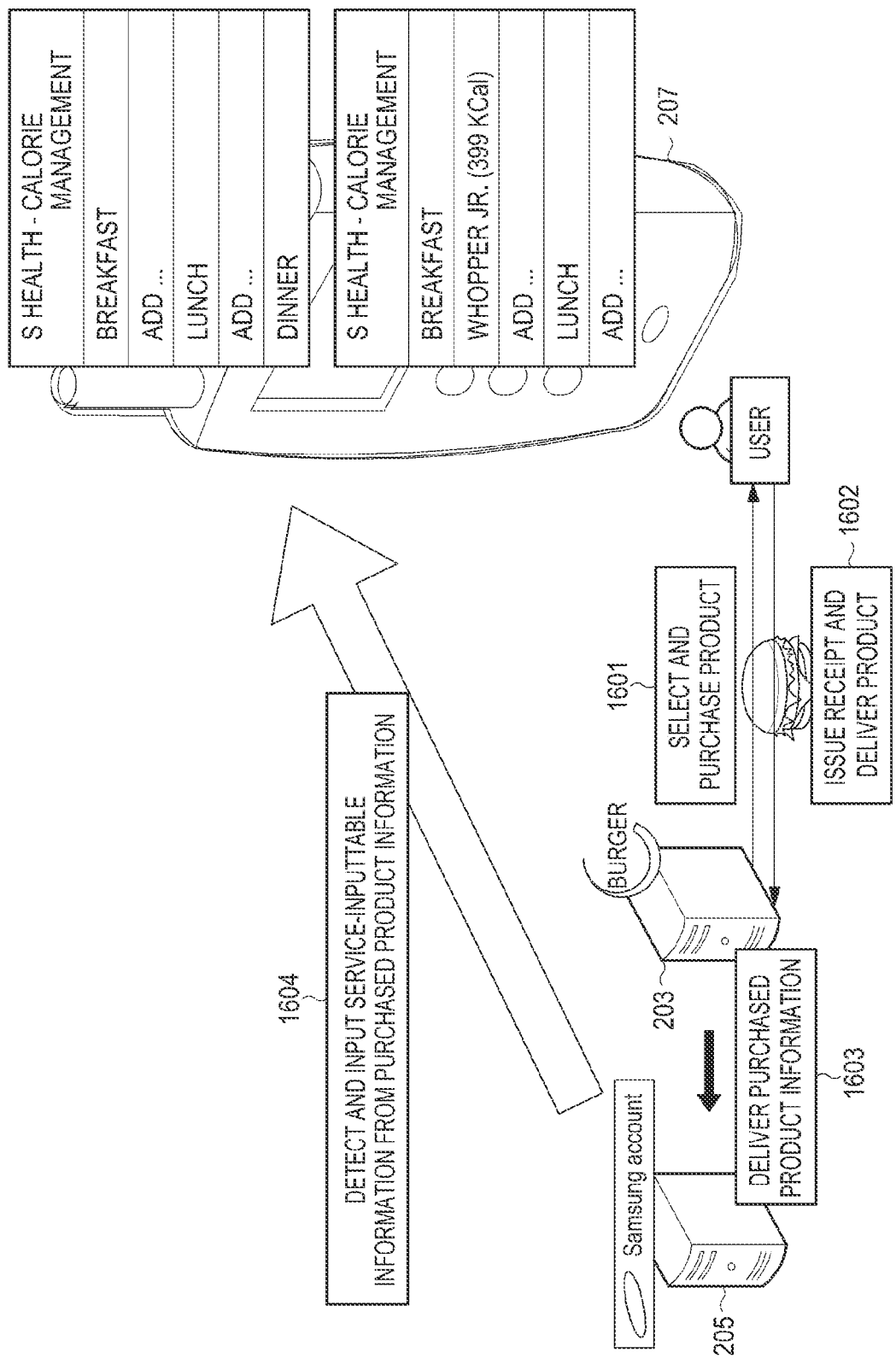
FIG. 16 illustrates an interworking method according to another embodiment of the present disclosure.

In another way to apply a method for delivering information about a new device to an existing device according to an embodiment of the present disclosure, if the user purchases food, information about the food may be transmitted to an interworking-target device. FIG. 16 illustrates such an embodiment of the present disclosure.

Referring to FIG. 16, a distributor may previously store information about food for sale (nutrients, calories, and so forth) in a server of the distributor (e.g. the new device management unit 203), and if a user of the interworking-target device 207 requests purchase of one of products to be sold by the distributor (the new device management unit 203) interworking with an account server (e.g., the existing device management unit 205) of the target device 207 in 1601, then the distributor (the new device management unit 203) provides the product to the purchaser (e.g. the target device 207), together with a receipt in 1602, and delivers information about the product purchased by the purchaser to the account server (the existing device management unit 205) by using the purchaser's account information registered in advance in the server of the purchaser 203 in 1603. The account server (the existing device management unit 205) having received product information of the purchaser delivers the product information to the interworking-target device 207 in a push manner in 1604. Then, the purchaser may check, through the target device 207, information such as nutrients, calories, and the like of the product, that is, food, purchased by the purchaser, and may use the information for health care, such as adjusting the amount of exercise or food intake or managing eating habits and body weight.

Meanwhile, in embodiments of the present disclosure, an apparatus used to purchase a new device is not limited, and the present disclosure may be applied to cases where a user purchases the new device using various means, such as a Personal Computer (PC), a laptop computer, a tablet PC, a smartphone, and so forth, according to user's convenience.

As is apparent from the foregoing embodiments of the present disclosure, when short-range communication is performed, if there are many identical types of devices or there are many nearby devices having high signal strengths, a target device which is to actually interwork may be easily identified, facilitating user convenience. In addition, a producer and/or a distributor input data that is input by a purchaser to a device during a purchasing process and deliver the input data to the purchaser, providing convenience in interworking with a device having no input/output function.

It should be noted that embodiments illustrated in the drawings are not intended to limit the scope of the present disclosure. That is, all components or operations disclosed in FIGS. 1 through 16 should not be interpreted as essential components for carrying out the present disclosure, and the present disclosure may be implemented merely with some components without departing from the gist of the present disclosure.

Operations of the above-described devices may be implemented by including a memory device having a program code stored therein in an arbitrary component of an apparatus. That is, a controller of the apparatus may perform the above-described operations by reading the program code stored in the memory device by a processor or a Central Processing Unit (CPU) and executing the program code.

The embodiments disclosed in the present specification and drawings have been provided to easily describe the present disclosure and to help understanding of the present disclosure, and are not intended to limit the scope of the present disclosure. Therefore, it should be construed that the scope of the present disclosure includes any change or other various embodiments based on the technical spirit of the present disclosure as well as the embodiments described herein.

What is claimed is:

1. A second device comprising:
   an interface unit; and
   a controller electrically coupled with the interface unit and configured to:
   control the interface unit to receive interworking information regarding a first device from a server;
   discover interoperable devices;
   identify an interworking history generated based on the interworking information; and
   display the first device and the interworking history, on a list of interoperable devices,
   wherein the interworking history indicates previous interworking between the first device and a third device having a same account as the first device.

2. A non-transitory storage medium having stored therein instructions which cause, when executed by at least one processor of a second device, the at least one processor to perform at least one operation which comprises:
   controlling an interface unit to receive interworking information regarding a first device from a server;
   discovering interoperable devices;
   identifying an interworking history generated based on the interworking information; and
   displaying the first device and the interworking history, on a list of the interoperable devices,
   wherein the interworking history indicates previous interworking between the first device and a third device having a same account as the first device.

3. A method for supporting interworking between a plurality of devices using short-range communication at a second device, the method comprising:
   controlling an interface unit to receive interworking information regarding a first device from a server;
   discovering interoperable devices;
   identifying an interworking history generated based on the interworking information; and
   displaying the first device and the interworking history, on a list of the interoperable devices,
   wherein the interworking history indicates previous interworking between the first device and a third device having a same account as the first device.

* * * * *